(12) United States Patent
Rajamanickam et al.

(10) Patent No.: US 8,843,677 B2
(45) Date of Patent: *Sep. 23, 2014

(54) OPTIMIZING AN OPERATING SYSTEM I/O OPERATION THAT PERTAINS TO A SPECIFIC PROGRAM AND FILE

(75) Inventors: Logeswaran T. Rajamanickam, Kunnathur (IN); Arun Ramakrishnan, Chennai (IN); Ashrith Shetty, Belthangady (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/589,749

(22) Filed: Aug. 20, 2012

(65) Prior Publication Data
US 2014/0006657 A1 Jan. 2, 2014

Related U.S. Application Data

(63) Continuation of application No. 13/534,958, filed on Jun. 27, 2012.

(51) Int. Cl.
*G06F 3/00* (2006.01)
*G06F 3/06* (2006.01)
*G06F 17/30* (2006.01)

(52) U.S. Cl.
CPC .......... *G06F 3/061* (2013.01); *G06F 17/30067* (2013.01)
USPC .................. 710/52; 710/36; 710/54; 711/154

(58) Field of Classification Search
None
See application file for complete search history.

(56) References Cited

U.S. PATENT DOCUMENTS

| 4,408,273 A | 10/1983 | Plow ...................................... 1/1 |
| 5,097,533 A | 3/1992 | Burger et al. .................. 719/328 |

(Continued)

FOREIGN PATENT DOCUMENTS

| EP | 0756228 A1 | 1/1997 | ................ G06F 3/06 |
| EP | 2251781 A1 | 11/2010 | ............. G06F 9/445 |
| JP | 2010186284 A | 8/2010 | ............. G06F 13/10 |

OTHER PUBLICATIONS

'Rapid-Cache—A Reliable and Inexpensive Write Cache for High Performance Storage Systems' by Yiming Hu et al., IEEE Transactions on Parallel and Distributed Systems, vol. 13, No. 2, Feb. 2002.*

(Continued)

*Primary Examiner* — Steven Snyder
(74) *Attorney, Agent, or Firm* — Yee & Associates, P.C.; Jeffrey S. LaBaw

(57) ABSTRACT

An embodiment of the invention pertains to a method that includes an operating system, program components running on the operating system, and a file system associated with one or more files. Responsive to a write request sent from a specified program component to the operating system, in order to write specified data content to a given file, the method determines whether the write request meets a criterion, which is derived from the identity of at least one of the specified program component, and the given file. If the criterion is met, a message is immediately sent to release the specified program component from a wait state. Data portions of the specified data content are then selectively written to a storage buffer, and subsequently written from the buffer to the given file.

20 Claims, 4 Drawing Sheets

(56) References Cited

U.S. PATENT DOCUMENTS

| | | | |
|---|---|---|---|
| 5,337,412 A | 8/1994 | Baker et al. | 719/324 |
| 5,386,525 A | 1/1995 | Noack | 1/1 |
| 5,522,054 A | 5/1996 | Gunlock et al. | 711/112 |
| 5,675,781 A | 10/1997 | Duncan et al. | 707/690 |
| 5,813,005 A | 9/1998 | Tsuchida et al. | 1/1 |
| 5,819,310 A | 10/1998 | Vishlitzky et al. | 711/114 |
| 5,870,587 A | 2/1999 | Danforth et al. | 710/72 |
| 5,901,319 A | 5/1999 | Hirst | 717/164 |
| 5,915,131 A | 6/1999 | Knight et al. | 710/72 |
| 5,925,109 A | 7/1999 | Bartz | 710/14 |
| 5,930,824 A | 7/1999 | Anglin et al. | 711/162 |
| 5,978,815 A | 11/1999 | Cabrera et al. | 1/1 |
| 5,999,930 A | 12/1999 | Wolff | 1/1 |
| 6,012,104 A | 1/2000 | Van Nguyen et al. | 710/8 |
| 6,044,415 A | 3/2000 | Futral et al. | 710/33 |
| 6,098,149 A | 8/2000 | Ofer et al. | 711/112 |
| 6,108,653 A | 8/2000 | Pereira | |
| 6,112,257 A | 8/2000 | Mason, Jr. et al. | 710/18 |
| 6,122,685 A | 9/2000 | Bachmat | 710/74 |
| 6,141,707 A | 10/2000 | Halligan et al. | 710/36 |
| 6,167,459 A | 12/2000 | Beardsley et al. | 710/3 |
| 6,170,023 B1 | 1/2001 | Beardsley et al. | 710/36 |
| 6,182,158 B1 | 1/2001 | Kougiouris et al. | 719/328 |
| 6,185,638 B1 | 2/2001 | Beardsley et al. | 710/36 |
| 6,192,359 B1 | 2/2001 | Tsuchida et al. | 1/1 |
| 6,199,117 B1 | 3/2001 | Cox et al. | 719/328 |
| 6,209,059 B1 | 3/2001 | Ofer et al. | 711/114 |
| 6,216,211 B1 | 4/2001 | McBrearty et al. | 711/162 |
| 6,219,693 B1* | 4/2001 | Napolitano et al. | 709/203 |
| 6,240,467 B1 | 5/2001 | Beardsley et al. | 710/5 |
| 6,301,605 B1* | 10/2001 | Napolitano et al. | 709/201 |
| 6,301,640 B2 | 10/2001 | Barve et al. | 711/113 |
| 6,442,548 B1* | 8/2002 | Balabine et al. | 1/1 |
| 6,502,205 B1* | 12/2002 | Yanai et al. | 714/6.32 |
| 6,671,767 B2 | 12/2003 | Furuumi et al. | 711/100 |
| 6,754,734 B2 | 6/2004 | Goode et al. | 710/24 |
| 7,024,593 B1* | 4/2006 | Budd et al. | 714/48 |
| 7,113,937 B2 | 9/2006 | Goode et al. | 1/1 |
| 8,200,930 B2* | 6/2012 | Hull et al. | 711/163 |
| 2003/0115221 A1 | 6/2003 | Goode et al. | 1/1 |
| 2003/0200193 A1* | 10/2003 | Boucher | 707/1 |
| 2007/0168567 A1* | 7/2007 | Boyd et al. | 710/5 |
| 2009/0177721 A1* | 7/2009 | Mimatsu | 707/205 |
| 2010/0095082 A1* | 4/2010 | Hull et al. | 711/171 |
| 2010/0205329 A1* | 8/2010 | Ukai et al. | 710/33 |
| 2011/0035618 A1* | 2/2011 | Jann et al. | 714/3 |
| 2012/0146420 A1* | 6/2012 | Wolfs | 307/77 |
| 2012/0151157 A1* | 6/2012 | Sela et al. | 711/154 |
| 2013/0326117 A1* | 12/2013 | Aune | 711/103 |
| 2014/0019684 A1* | 1/2014 | Wei et al. | 711/114 |

OTHER PUBLICATIONS

'Beating the I/O Bottleneck: A Case for Log-Structured File Systems' by John Ousterhout and Fred Douglis, Computer Science Division, Electrical Engineering and Computer Sciences, University of California at Berkeley, Oct. 30, 1988.*

'Sun StorEdge FastWrite Cache 2.0 System Administrators Guide' copyright 2000 by Sun Microsystems, Inc.*

Wikipedia' article on 'Asynchronous I/O' archived Jun. 22, 2012.*

Gunawi et al., "Improving File System Reliability with I/O Shepherding," Proceedings of 21st ACM SIGOPS symposium on Operating Systems Principles, vol. 41, Issue 6, Dec. 2007, pp. 293-306.

Kohler, "EMC Information Sharing: Direct Access to MVS Data from UNIX and NT," Proceedings of the 1999 ACM SIGMOD International Conference on Management of Data, Philadelphia Pennsylvania, SIGMOD Record, Jun. 1999, vol. 28, Issue 2, pp. 523-524.

Martin et al., "Performance Analysis of the VSAM Method," Angewandte Informatik, vol. 27, Issue 8, Aug. 1985, pp. 10 pages (English abstract at p. 2).

Simpson et al., "Using APL as a Preprocessing Selector from Large VSAM Files," APL '84, Proceedings of the International Conference on APL, vol. 14, Issue 4, Jun. 1984, pp. 297-302.

Smith et al., "A Versatile, Source-Independent System for Digital Data Management," EOS Transactions, American Geophysical Union, vol. 67, Issue 15, Apr. 15, 1986, 5 pages.

Welsh, "NBIO: Nonblocking I/O for Java," Harvard University, Jul. 2002, 5 pages, accessed Sep. 7, 2012 http://www.eecs.harvard.edu/~mdw/proj/java-nbio.

Office action dated Jul. 30, 2004 regarding U.S. Appl. No. 10/033,809, 10 pages.

Final office action dated Jan. 27, 2005 regarding U.S. Appl. No. 10/033,809, 4 pages.

Office action dated May 5, 2008 regarding U.S. Appl. No. 10/033,809, 8 pages.

Notice of allowance dated Dec. 14, 2005 regarding U.S. Appl. No. 10/033,809, 8 pages.

Notice of allowance dated May 17, 2006 regarding U.S. Appl. No. 10/033,809, 5 pages.

Rajamanickam et al., Optimizing an Operating System I/O Operation that Pertains to a Specific Program and File U.S. Appl. No. 13/534,958, filed Jun. 27, 2012, 30 pages.

* cited by examiner

OPTIMIZING AN OPERATING SYSTEM I/O OPERATION THAT PERTAINS TO A SPECIFIC PROGRAM AND FILE

This application is a continuation of and claims the benefit of priority to U.S. patent application Ser. No. 13/534,958, filed on Jun. 27, 2012 and entitled "Optimizing an Operating System I/O Operation that Pertains to a Specific Program and File". The contents of which are hereby incorporated by reference.

BACKGROUND OF THE INVENTION

1. Field of the Invention

The invention disclosed and claimed herein pertains to a method and apparatus for optimizing an input/output (I/O) operation of an operating system. More particularly, the invention pertains to a method and apparatus of the above type, wherein optimization is achieved by using the identities of a specific file and program, or program component, which are related to or associated with the I/O operation.

2. Description of the Related Art

Application programs running on a computing platform often need to do many file I/O operations, such as writing data to a related file system in a disk storage or the like, and reading data from the file system. Whether or not data is read from the file system, nearly all application programs must write data to a file of the file system at some time. For example, applications generally need to log respective events to a file on the disk. This typically involves APIs of the file system.

While file system APIs are not the same in all program languages, it is generally true that all APIs hand over read and write requests to the underlying operating system. The operating system then carries out I/O operations that are respectively associated with or specified by the requests. More particularly, if an application program calls or sends an I/O request such as a write request to a given API, the API will deliver the write request to the operating system. However, a problem in such arrangements is that after the call, the API may block further processing activity of the caller application. The given API will return control to the caller only after data content pertaining to the write request has been written to the disk. This problem can affect both synchronous and asynchronous I/O operations.

In synchronous file I/O, an application thread starts an I/O operation and then immediately enters a wait state, until the I/O request has completed and the thread is notified of the completion. In asynchronous file I/O, an application thread calls an I/O request, and then continues processing another job until the operating system kernel signals to the thread that the called I/O operation is complete. The thread then interrupts its current job, and processes data pertaining to the I/O operation as necessary. Thus, application programs that write data to disk files generally are interrupted for a time which is directly proportional to the amount of data that must be written to the disk. This occurs because calls to start write operations by using the file system APIs are in turn implemented by the underlying operating system. The operating system blocks the calling application until the write operation is completed.

SUMMARY

In embodiments of the invention, a layer of an operating system intercepts I/O operations such as a write to a file, which is sent from an application or other program. Data content of an I/O operation that is to be written is delivered to a buffer before being written to the file, so that the time the program is interrupted by the I/O operation may be significantly reduced. It may also be determined that it is not necessary to write some or all of the data content to the file.

Embodiments of the invention can include a method, an apparatus, and a computer program product. One embodiment pertains to a method in a data processing system that includes an operating system, one or more program components running on the operating system, and a file system associated with one or more files. In response to a given write request sent from a specified program component to the operating system, in order to write specified data content to a given file, the method determines whether the given write request meets a criterion, wherein the criterion is derived from the identity of at least one of the specified program component, and the given file. Responsive to determining that the given write request meets the criterion, a message is immediately sent to release the specified program component from a wait state. The method further includes selectively writing data portions of the specified data content to a storage buffer, and subsequently writing each data portion from the storage buffer to the given file.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 1:
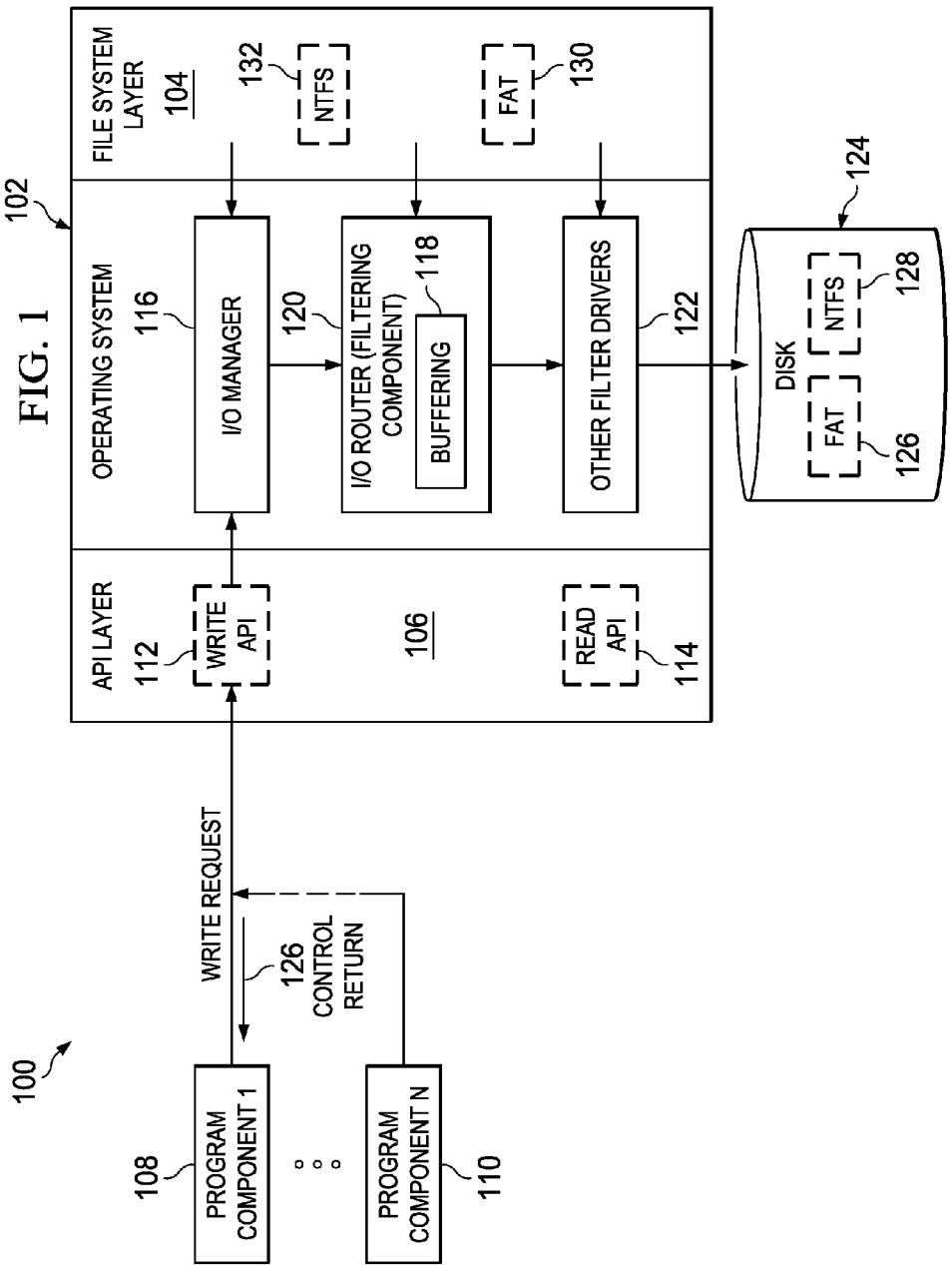
FIG. 1 is a schematic diagram illustrating components for an embodiment of the invention.

Referring to FIG. 1, there is shown a computer or data processing system 100 that comprises an operating system 102, wherein operating system 102 has a file system layer 104 and an API layer 106. System 100 further comprises a number of software programs or program components, such as application programs. These are shown in FIG. 1 as program components 108 and 110, also referenced as components 1 and N, respectively, where N is any reasonable number greater than 1. As used herein, the term "program component" means or refers to any software program or portion thereof, including, without limitation, application programs; application services such as operating system service programs; software programs in the form of script language code, compiled code and interpreted code; code implemented in hardware such as by a hardware component; and also any process or instance of any of the above.

FIG. 1 further shows API layer 106 provided with a write API 112, and with a read API 114. Operating system 102 has an I/O manager layer 116, and an I/O router layer 120 that is provided with a buffering capability, represented as element 118. I/O router 120 is configured to function as a filtering component for write requests, by implementing an algorithm in accordance with an embodiment of the invention, as described hereinafter in connection with FIG. 2. In these illustrative examples, I/O router 120 may be implemented by a program module that is located in operating system 102, by a program module in a driver, such as a file system driver, by a program module in an application program, or by any other mechanism suitable for providing program code to perform the operations of I/O router 120. For example, a file system may be installed to operate in conjunction with operating system 102. In this example, the installation of the file system may interact with I/O manager layer 116 to configure a program module, such as a driver and other plug-in, located in the file system for use as I/O router layer 120. As another example, an application program running in operating system 102 may use application programming interfaces in I/O manager layer 116 to configure a call back to a program module in the application program for use as I/O router layer 120. Operating system 102 is further provided with a layer 122, which pertains collectively to other filter drivers included in operating system 102, if any, as described hereinafter in further detail.

System 100 further includes a storage disk 124, such as a hard disk drive or other hardware for storing data. Data is stored in disk 124 in close association with file system 104.

Referring further to FIG. 1, there is shown a write request sent from one of the program components, such as program 108, to operating system 102. The write request is initially directed to write API 112, and is then sent by I/O manager 116 to I/O router 120. Upon receipt, I/O router 120 makes one or more decisions in regard to the write request and the data content associated with the write request, as described hereinafter. One of the decisions may be that the requested write operation should be treated as though it was then completed. In this event, a control return message is immediately sent back to the application or other program that sent the write request, such as message 126 sent to program 108. Upon receiving this message, the caller program is no longer blocked by the operating system, and may exit from a wait state.

In operating system 102 of FIG. 1, file system layer 104 is configured to add functionality to each of the layers 116, 120 and 122, in order to enable each layer to carry out its respective tasks. Functionality is added by implementing program components to use in each of these layers.

FIG. 1 further shows the disk 124 partitioned to include a File Allocation Table (FAT) component 126, and a New Technology File System (NTFS) component 128. File system 104 is provided with corresponding components 130 and 132.

Figure 2:
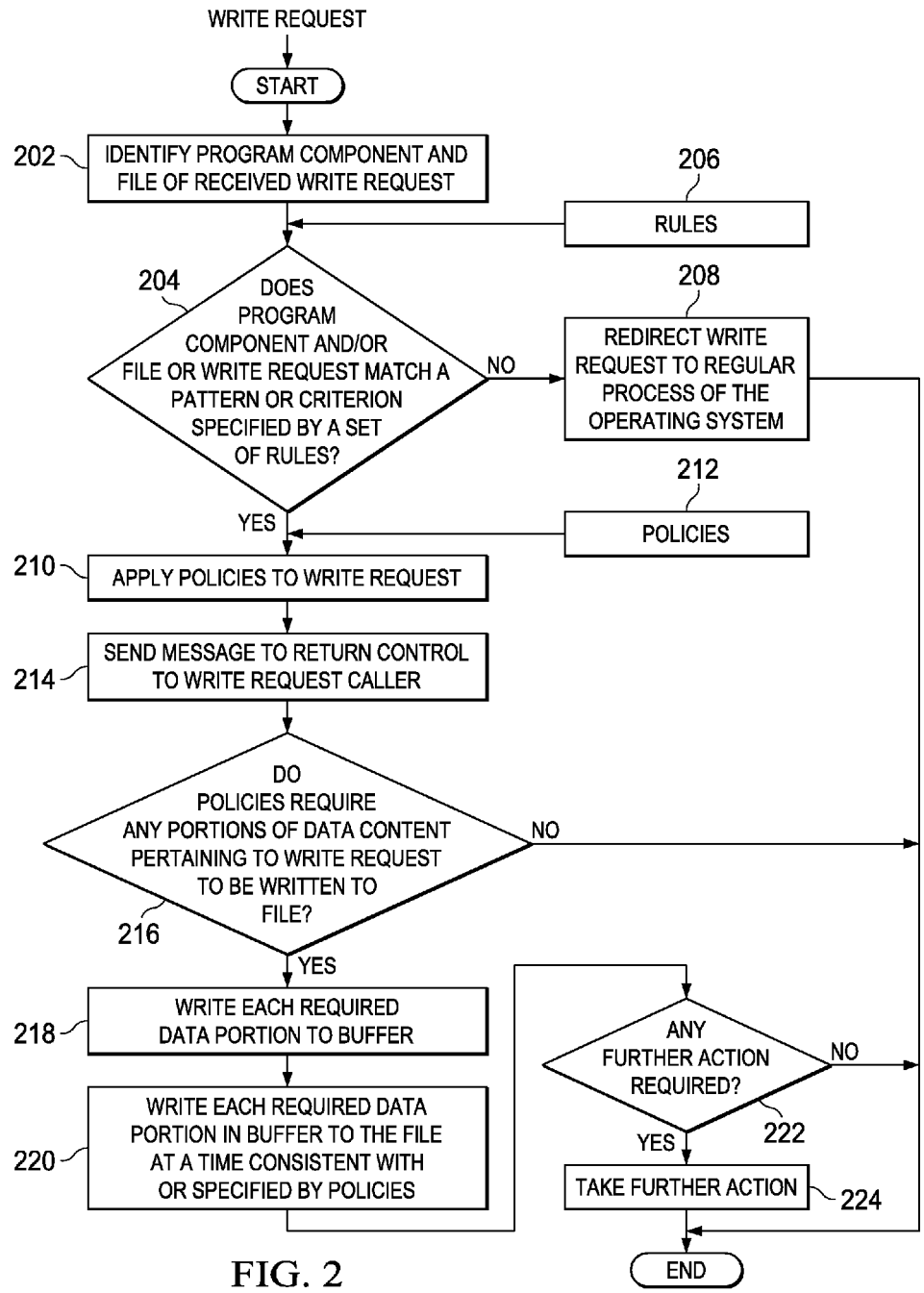
FIG. 2 is a flow chart that shows steps of an algorithm for an embodiment of the invention.

Referring to FIG. 2, there are shown steps for an algorithm or other procedure for implementing an embodiment of the invention. The algorithm may be implemented by I/O router 120 of FIG. 1, when a write request is received by I/O router 120. However, the invention is not limited thereto. In the embodiment of FIG. 2, the algorithm starts when a write request is received by the I/O router 120 or other implementing component. It is understood that a write request will be sent from a particular program or program component, such as application program 108, and will indicate that specified data content is to be written to a particular file of disk 124.

In accordance with embodiments of the invention, it has been recognized that the program source of a write request, the file to which the data content of a write request is directed, or both the program source and the file, can be very significant in determining how successive write requests are to be handled. In view of this, step 202 requires identifying or defining both the program component and the file associated with a received write request. Usefully, the identity of the file is included with the write request, and can be acquired therefrom. The program component may usefully be identified from the command that was used to start the program component. Alternatively, other file and program identifiers may be derived from the write request.

Step 204 of the algorithm of FIG. 2 requires determining whether the program component and/or the file of a received write request matches a pattern, or meets a criterion, which is provided or specified by a set of rules. FIG. 2 shows a set of rules 206, which is furnished to step 204 for use thereby. Illustrative examples of rules which could be included in a set of rules 206 are set forth hereinafter as Rule Examples 1-4.

Both Text Matching and Regular Expressions can be used in implementing rules for evaluating write requests. With Text Matching, a rule can be created which intercepts a write request, and thus selects it for further processing in accordance with the algorithm of FIG. 2, if the name of the file exactly matches a text provided by a user. An example of this is as follows:

Rule Example 1

---

If filename equals "C:/Program Files/WebServer/logs/activity.log"
 then run policies
 else redirect to operating system

---

Rule Example 2

An example of the use of Regular Expressions to match files could be that the Regular Expression will match any file that has an extension log. As an illustration, this expression would match:

---

"C:/Program Files/WebServer/logs/activity.log"
 or "/opt/WebServer/logs/activity.log".

---

Stated more generally, this rule would be as follows:

---

If filename matches ".*\.log"
 then run policies
 else redirect to operating system

---

The above two examples match the file that is being written to, as indicated by the write request. As another option, a rule can be based on the program or program component that is writing to a file, and thus provides the write request. In an operating system, a program is typically defined or identified by a command that was issued to start it, or by a. It would generally be more useful to use the command to identify the program component, as stated above, since the process id can change each time the program runs. An example of a rule 206 which identifies the program that is writing to a file would be as follows:

Rule Example 3

---
If command equals "/root/WebServer/bin/startWebServer.sh"
   then run policies
      else redirect to operating system
---

The above rule will intercept any file writing that is done by the program "/root/WebServer/bin/startWebServer.sh". However, for some situations it may not be a good idea to intercept every write request from this program. Accordingly, a rule may be used that includes both the identities of the program and the file being written to. An example of this rule is as follows:

Rule Example 4

---
If command equals "/root/WebServer/bin/startWebServer.sh" and filename equals "C:/Program Files/WebServer/logs/activity.log"
   then run policies
      else redirect to operating system
---

The above exemplary rules could generally be in any language, based on a given implementation. By creating a set of such rules, a set of detailed conditions or criteria are provided which are used by I/O router 120 to decide whether it needs to intercept a given write request, or hand it back to the operating system. Thus, referring further to FIG. 2, if it is determined at step 204 that neither the program component or the file associated with a write request matches a criterion or pattern of a set of rules, as described above, the write request is not intercepted by I/O router 120. Instead, the write request is redirected back to the regular flow or process of operating system 102, and the algorithm of FIG. 2 ends.

Conversely, if the program component and/or file of the write request does match a pattern or criterion of a set of rules, the write request is intercepted and the algorithm proceeds to step 210. At this step, one or more policies of a set of polices 212 are applied to the write request and to data content associated with the request. Also, as shown at step 214, a message is sent to return control to the write request caller, such as the application program or other program component that called the write request. Such caller is thereby released from any wait state it may have been in, and can immediately return to processing activity, while the write request is being handled further.

After a write request has been intercepted, a wide range of actions can be taken at step 210, as determined by respective policies 212. The terms "Condition", "Action" and "Content" are associated with examples of policies 212, which are set forth below. These terms are defined as follows:

Condition—A condition is (similar to in a rule) any check that is run and results in a True or False
   Action—An action is a task that must be performed and in this case based on the result of a condition.
   Content—Content refers to the actual data being written to a file In a policy 212, the conditions could be significantly more complex than for rules 206. A policy could decide to take an Action based on the Content of the write request, or mathematical functions or even on the current time of day, by way of example. An example of a policy 212 is as follows:

Policy Example 1

A user could choose to ignore or modify the Content being written. In an example, a program is trying to write the following lines to a file (which could typically appear in a WebServer log file):

---
[13/10/11 8:36:17:144 CEST] DEBUG [EncodingPrestationsSDO:BUDO23046:808346] SELECT RRN(p)
[13/10/11 8:36:17:168 CEST] DEBUG [EncodingPrestationsSDO:BUDO23046:808346] SQL Done in ms 24 size 3
[13/10/11 8:36:17:272 CEST] DEBUG [EncodingPrestationsSDO:LEONA:808326] SQL Done in ms 213 size 55
[13/10/11 8:36:17:355 CEST] DEBUG [CarteSocialeBean:POSKI:808342] PAT002AR BasicBean.handleRPGErrorParams: No OUTRETUPD --> skipping
[13/10/11 8:36:18:055 CEST] DEBUG [EncodingPrestationsSDO:BONOMO:808387] SELECT RRN(p)
[13/10/11 8:36:18:147 CEST] INFO [AS400ConnectionFactory:] !!! AS400ConnectionFactory.getConnection - NEW as400 connection for user:WASY23260 for sessionID:k51QAGSZXRtkKfJqU-0CZyG
[13/10/11 8:36:18:157 CEST] ERROR [LoginBean:] !!! LoginBean.login - when error destroy this connection for sessionID:k51QAGSZXRtkKfJqU-0CZyG
[13/10/11 8:36:18:157 CEST] INFO [WishConnectionFactory:] destroySession - close AS400 and JDBC connection for sessionID:k51QAGSZXRtkKfJqU-0CZyG WASY23260
[13/10/11 8:36:18:255 CEST] ERROR [CMD020MR:] com.ibm.as400.access.AS400SecurityException: Password is incorrect.
---

The user could decide that any line that contains the word DEBUG can be ignored, because this is useful only to the programmer of the application, and does not help the System Administrator on a live running deployment. In this case, the user doesn't have a specific Condition to check, but only wants to modify the content. Thus, the policy would simply have an action to take on the Content, as follows:

---
policy
{
     removeDebugData(Content)
};
---

Once this action is taken, the final write to the file would only contain

---
[13/10/11 8:36:18:147 CEST] INFO [AS400ConnectionFactory:] !!! AS400ConnectionFactory.getConnection - NEW as400 connection for user:WASY23260 for sessionID:k51QAGSZXRtkKfJqU-0CZyG
[13/10/11 8:36:18:157 CEST] ERROR [LoginBean:] !!! LoginBean.login - when error destroy this connection for sessionID:k51QAGSZXRtkKfJqU-0CZyG
[13/10/11 8:36:18:157 CEST] INFO [WishConnectionFactory:] destroySession - close AS400 and JDBC connection for sessionID:k51QAGSZXRtkKfJqU-0CZyG WASY23260
[13/10/11 8:36:18:255 CEST] ERROR [CMD020MR:] com.ibm.as400.access.AS400SecurityException: Password is incorrect.
---

Applying the above policy to the data content of a write request assists in ensuring that disk space is not used up by data that is not needed.

A further example of a policy 212 is as follows:

Policy Example 2

It is required to notify a System Administrator when a WebServer logs a very specific error message, "ERROR Server has crashed". During working hours, the administrator must be sent an email and at other times an SMS message must be sent to his mobile phone. Also, a rule has already been run to check that the filename and the command match C:/Program Files/WebServer/logs/activity.log" and "/root/ WebServer/bin/startWebServer.sh", and it has been determined that a notification as required above must be made to the System Administrator. A policy to accomplish this could be as follows:

```
policy
{
If Content contains "ERROR Server has crashed"
then
{
        If duringWorkingHours(currentTime)
            then sendEmail(Content)
            else sendSMSMessage(Content)
    }
};
```

To paraphrase this policy, first the Content is checked for a specific set of words. If these are there, then the policy checks if the current time is during working hours. If it is working hours, then an email is sent containing the Content that was to be written to a file, and otherwise the same is sent via an SMS message.

Referring further to FIG. 2, after any pertinent policies have been applied to a write request and its associated data content, step 216 determines whether any portions of the data content are to be written to the file specified by the write request. It is anticipated that application of some policies 212 in fact will require that none of the data content is to be written to the file. In this case, the algorithm of FIG. 2 will end.

If it is determined at step 216 that some or all portions of the data content are to be written to the file, each of such data portions is written to a storage buffer in accordance with step 218. The buffer could, for example be a cache associated with the memory of system 100.

At step 220, each data portion written to the storage buffer is subsequently written to the file specified by the write request, such as a file on disk 124. This action is taken in accordance with any policies that apply. For example, a policy may require that data in the buffer is to be written to the disk when the buffer size exceeds 20 kb, or data is to be written to the disk at regular intervals of 5 minutes or the like.

At step 222, it is necessary to determine whether or not any further action is required. If not, the algorithm ends. Otherwise, the algorithm proceeds to step 224 to take the necessary action. One example of such further action would be the need to send an email or an SMS message to the system administrator, as required by Policy Example 2, described above.

By means of the algorithm of FIG. 2, the set of rules can be used to quickly decide if a given write request should be intercepted or not. If the write request is intercepted, a wide range of actions can then be taken in regard to the write request and its content.

Figure 3:
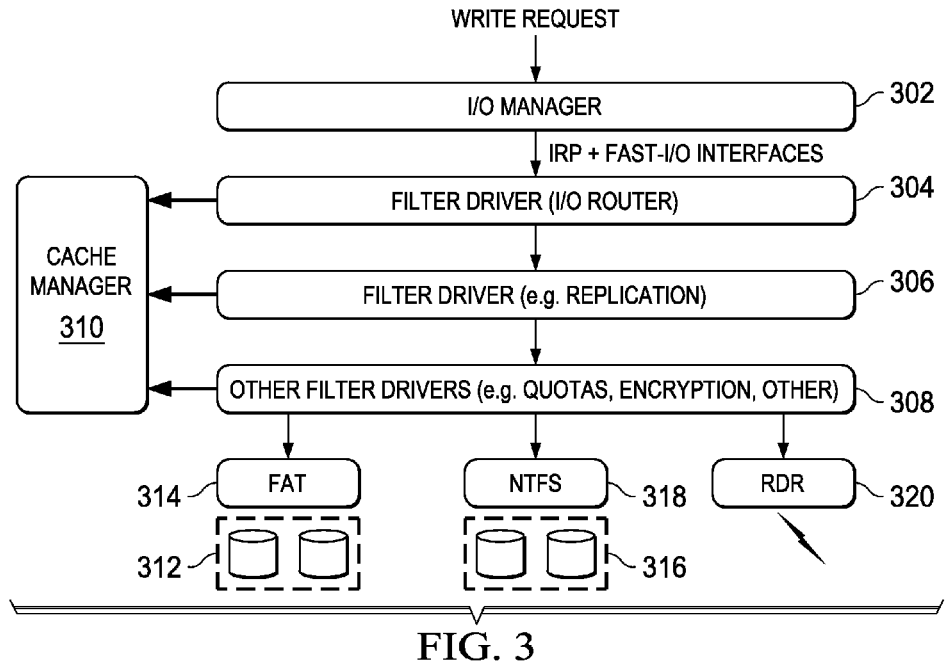
FIG. 3 and FIG. 4 are schematic diagrams that each depicts components for an embodiment of the invention.

Referring to FIG. 3, there is shown an embodiment of the invention, wherein an I/O manager 302 of an operating system is similar or identical to I/O manager 116 of FIG. 1. Various I/O requests come to I/O manager 302, such as a write request shown as an input thereto. I/O manager 116 issues I/O Request Packets (IRPs) and fast I/O requests to a File System Driver (FSD), which may comprise one or more filter driver components. In the embodiment of FIG. 3, a filter driver 304, which is configured to carry out respective functions of I/O router 120 as described above, is positioned between I/O manager 116 and filter driver components 306 and 308 of the FSD.

Filter driver 304 performs a filtering process on received write requests, as described above in connection with FIG. 2. Some of the data content of write requests is routed to a buffer by filter driver 304. This is carried out in the embodiment of FIG. 3 by directing the write requests to a cache manager 310. Filter driver 304 may also determine that some or all of the data content of a write request should not be written to disk file. Filter driver 304 may determine further that a received write request should simply flow through to filter driver components 306 and 308 of the FSD, for processing thereby.

Component 306 pertains to replication. Component 308 is directed to generic filter drivers associated with different functions, including quotas and encryption, but is not limited thereto. The FSD of FIG. 3 can deliver data to disk 312 of a File Allocation Table (FAT) 314, to a disk 316 of a New Technology File System (NTFS) 318, or to a secure communication network 320 such as an RDR network.

Figure 4:
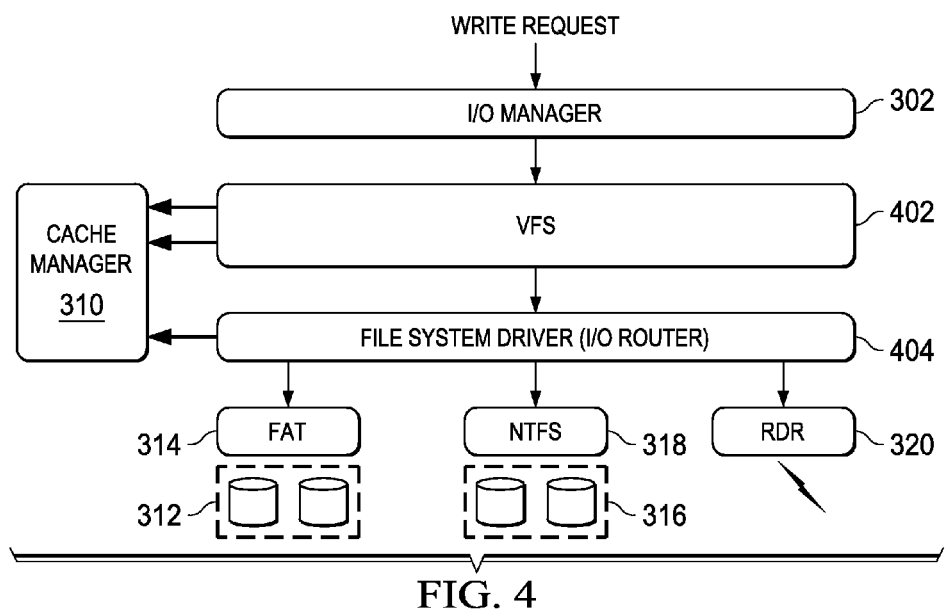

FIG. 4 shows an embodiment of the invention which is similar to the embodiment of FIG. 3, except that write requests from I/O manager 302 are delivered to a virtual file system (VFS) 402 instead of an FSD. The write requests are then sent to a file system driver 404, which carries out the respective functions of I/O router 120 as described above.

Figure 5:
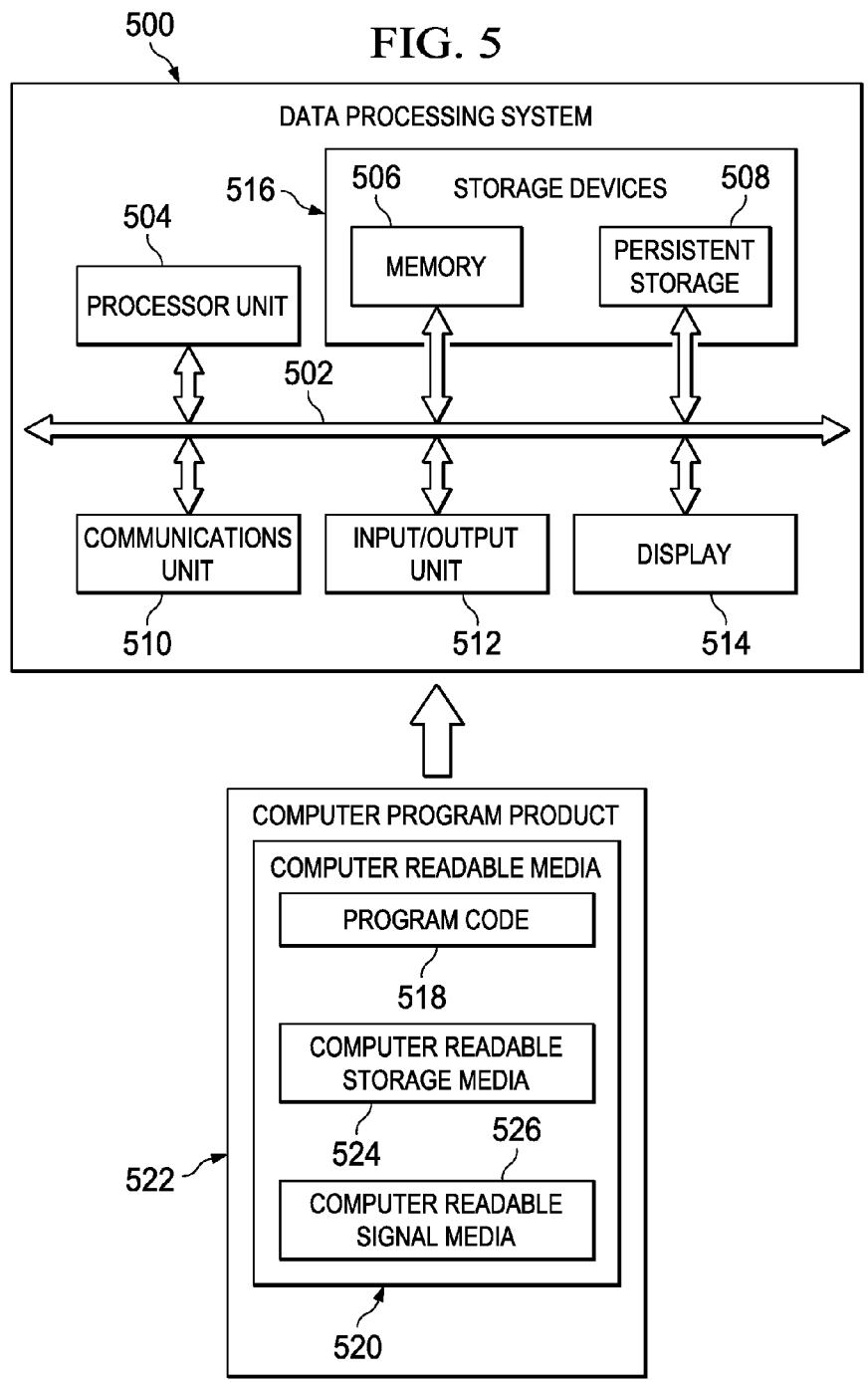
FIG. 5 is a block diagram showing a computer or data processing system that may be used in implementing embodiments of the invention.

FIG. 5 depicts a diagram of a data processing system in accordance with an illustrative embodiment. Data processing system 500 is an example of a computer, which may be used to implement one or more components of embodiments of the invention, and in which computer usable program code or instructions implementing the processes may be located for the illustrative embodiments. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide physical or architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In a data processing system that includes an operating system, one or more program components running on the operating system, and a file system associated with one or more files, a computer program product executable in a computer recordable storage medium comprising:
   instructions responsive to a given write request sent from a specified program component to the operating system, in order to write specified data content to a given file, for determining whether the given write request meets a criterion derived from the identity of at least one of the specified program component and the given file;
   instructions responsive to determining that the given write request meets said criterion, for immediately sending a message to release the specified program component from a wait state and applying one or more policies to the specified data content, in order to determine whether any portion of the specified data content needs to be written to the given file, and if so, selecting each such data portion to be written to the given file;
   instructions for selectively writing data portions of the specified data content to a storage buffer based on the one or more policies; and
   instructions for subsequently writing each data portion of the data portions in the storage buffer to the given file.

2. The computer program product of claim 1, wherein:
   the specified program component is in a wait state prior to determining that the given write request meets the criterion, and the specified program is released from the wait state before any of the specified data content is written to the given file.

3. The computer program product of claim 1, wherein:
   it is determined by applying one of said policies to the specified data content that a specified portion of the specified data content should be written to the given file, wherein said specified portion is less than all of the specified data content.

4. The computer program product of claim 1, wherein:
   it is determined by applying one of said policies to the specified data content that none of the specified data content should be written to the given file.

5. The computer program product of claim 1, wherein:
   the operating system has a specified process for handling write requests, and responsive to determining that the given write request does not meet said criterion, the given write request is directed or redirected, selectively, to said specified handling process of the operating system.

6. The computer program product of claim 5, wherein:
   the specified process for handling write requests of the operating system is an instance of a program module configured in the operating system to intercept write requests received by the operating system.

7. The computer program product of claim 1, wherein:
said criterion is met if the given file of the given write request matches a predetermined file, or if the specified program component of the given write request matches a predetermined program component, wherein the given file matching the predetermined file is determined using a regular expression rule that specifies a logical expression that the given file conforms to, and wherein the predetermined program component is identified from a command used to start the program component.

8. The computer program product of claim 1, wherein:
said criterion is met if both the given file of the given write request matches a predetermined file, and the specified program component thereof matches a predetermined program component.

9. The computer program product of claim 1, wherein:
responsive to applying one or more of said policies to the specified data content, it is determined that further action needs to be taken, in addition to writing any selected data portion to the storage buffer or to the given file.

10. The computer program product of claim 9, wherein:
said further action comprises sending a specified message to a system administrator.

11. In a data processing system that includes an operating system, one or more program components running on the operating system, and a file system associated with one or more files, an apparatus comprising:
processing means, responsive to a given write request sent from a specified program component to the operating system, in order to write specified data content to a given file, for determining whether the given write request meets a criterion, wherein said criterion is derived from the identity of at least one of the specified program component and the given file;
processing means, responsive to determining that the given write request meets said criterion, for immediately sending a message to release the specified program component from a wait state and applying one or more policies to the specified data content, in order to determine whether any portion of the specified data content needs to be written to the given file, and if so, selecting each such data portion to be written to the given file;
processing means for selectively writing data portions of the specified data content to a storage buffer based on the one or more policies; and
processing means for subsequently writing each data portion of the data portions in the storage buffer to the given file.

12. The apparatus of claim 11, wherein:
the specified program component is in a wait state prior to determining that the given write request meets the criterion, and the specified program is released from the wait state before any of the specified data content is written to the given file.

13. The apparatus of claim 11, wherein:
it is determined by applying one of said policies to the specified data content that a specified portion of the specified data content should be written to the given file, wherein said specified portion is less than all of the specified data content.

14. The apparatus of claim 11, wherein:
it is determined by applying one of said policies to the specified data content that none of the specified data content should be written to the given file.

15. The apparatus of claim 11, wherein:
the operating system has a specified process for handling write requests, and responsive to determining that the given write request does not meet said criterion, the given write request is directed or redirected, selectively, to said specified handling process of the operating system.

16. The apparatus of claim 15, wherein:
the specified process for handling write requests of the operating system is an instance of a program module configured in the operating system to intercept write requests received by the operating system.

17. The apparatus of claim 11, wherein:
said criterion is met if the given file of the given write request matches a predetermined file, or if the specified program component of the given write request matches a predetermined program component, wherein the given file matching the predetermined file is determined using a regular expression rule that specifies a logical expression that the given file conforms to, and wherein the predetermined program component is identified from a command used to start the program component.

18. The apparatus of claim 11, wherein:
said criterion is met if both the given file of the given write request matches a predetermined file, and the specified program component thereof matches a predetermined program component.

19. The computer program product of claim 8, wherein:
the given file matching the predetermined file is determined using a regular expression rule that specifies a logical expression that the given file conforms to, and wherein the predetermined program component is identified from a command used to start the program component.

20. The apparatus of claim 18, wherein:
the given file matching the predetermined file is determined using a regular expression rule that specifies a logical expression that the given file conforms to, and wherein the predetermined program component is identified from a command used to start the program component.

* * * * *